June 20, 1967 — R. A. YOUNG — 3,326,261
TIRES
Filed July 8, 1964 — 2 Sheets-Sheet 1
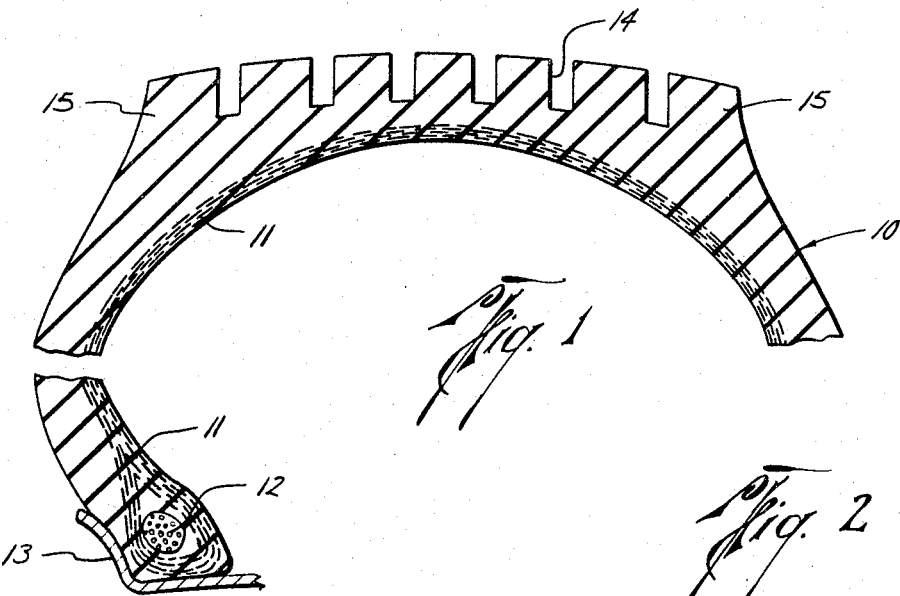
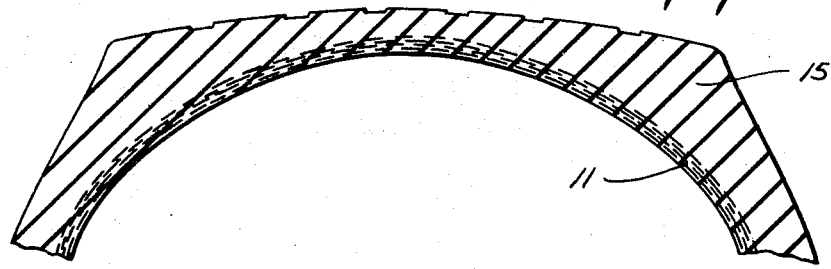
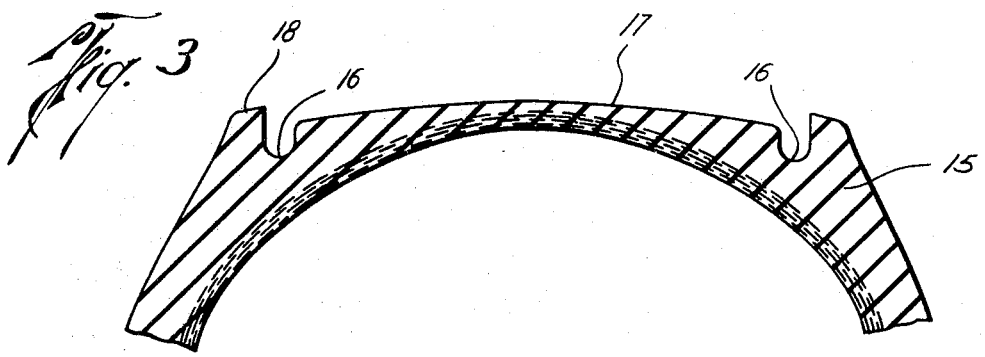
Robert A. Young
INVENTOR.
BY Browning, Simms, Hyer & Eickenroht
ATTORNEYS

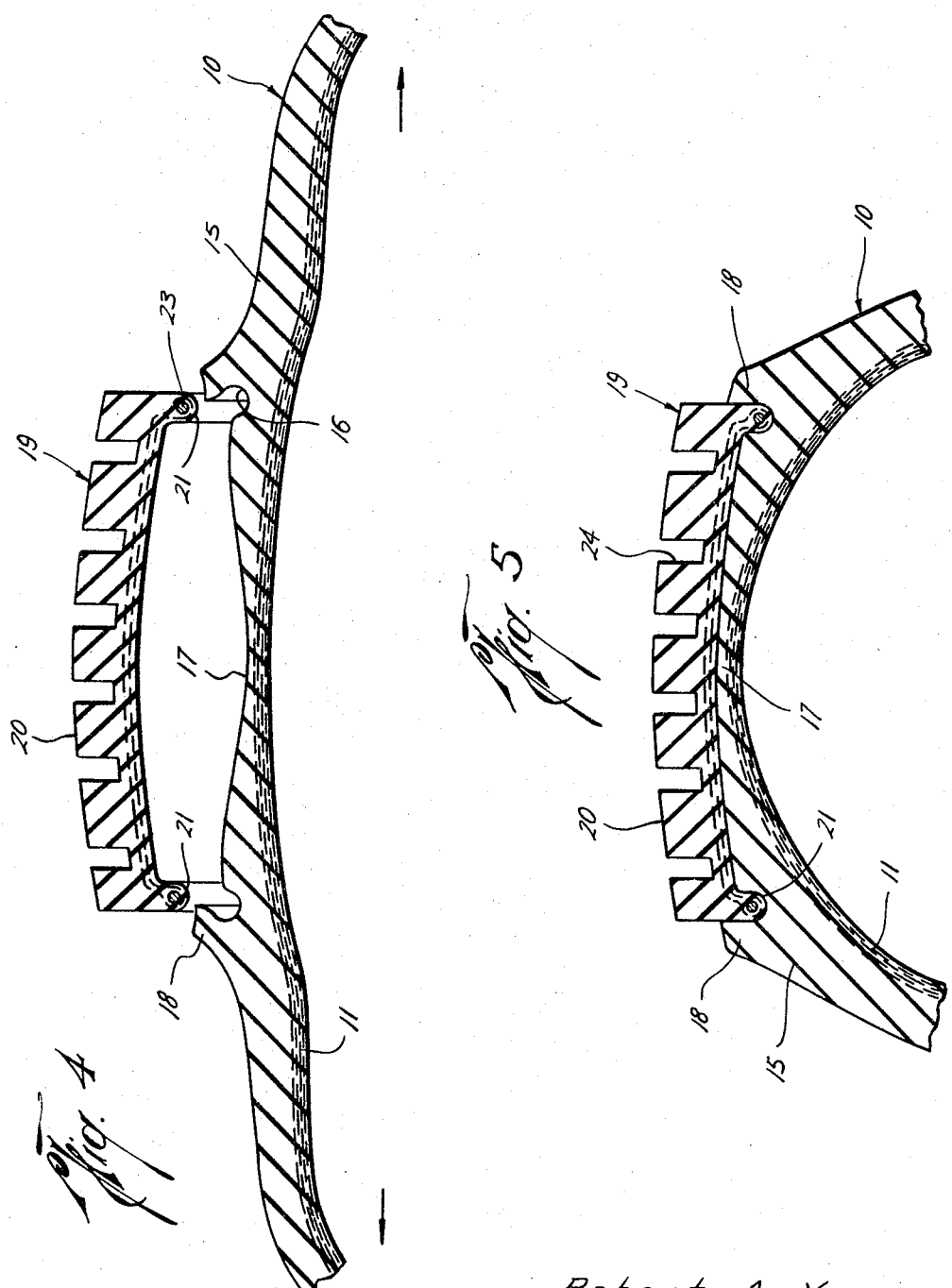

3,326,261
TIRES
Robert A. Young, 4549 Gollihar, Apt. 1,
Corpus Christi, Tex. 78411
Filed July 8, 1964, Ser. No. 381,060
2 Claims. (Cl. 152—176)

This invention relates generally to inflatable tires of rubber or rubber-like material. More particularly, this invention relates to improvements in the retreading of tires, including materials and parts which are especially useful for this purpose.

According to present practices, the worn surface of a tire to be retreaded is buffed and sprayed with cement, and a strip of rubber or rubber-like material (known as "camelback") is disposed about such surface and pressed tightly against the cement. The carcass and strip are then placed in a mold which has the desired tread design formed therein, the carcass is inflated, and heat is applied to the mold to "cook" the strip to the carcass and form the tread design in the outer surface of the strip.

Despite the fact that this is a time honored and almost universal practice, it nevertheless has several shortcomings, not the least of which is the "down time" involved. Thus, the owner of the vehicle is without its use, or, in the alternative, the party providing the retreading service must provide the owner's vehicle with replacemnt tires, for at least the time required to perform the above described process.

Furthermore, in order for this process to have any chance of success, the carcass must be relatively free from defects. That is, ruptures or the like in the carcass are actually made worse during the cooking process. Also, of course, care must be taken to avoid anything which would result in voids being formed between the carcass and strip as the two are molded to one another.

Over and above the foregoing, this process is inherently uneconomical and unsuitable for mass production purposes. Thus, the molds alone are generally so expensive as to put them beyond the reach of the average tire dealer. Also, the "camelback" is of such nature that unless it is used as soon as possible, it will break down. Still further, the tire owner's return on his investment in the retread is necessarily limited by the remaining life of the carcass. As a result, many owners are justifiably reluctant to retread their tires.

It is an object of this invention to provide a method of retreading an inflatable tire which involves very little downtime, and particularly not substantially more time than is involved in changing a flat tire.

Another object is to provide such a method which does not require that the carcass be cooked, and which therefore neither accentuates existing weaknesses in the tire nor requires the expensive molds heretofore employed.

Still another object is to provide a retreaded tire in which the carcass need not meet the rigid requirement of those which are retreaded by present methods.

A further object is to provide a tread material as well as a preformed band of same which are especially useful in the above described retreading process in that they may be used with more than one carcass and are therefore not limited by the remaining life of the tire carcass.

These and other objects are accomplished, in accordance with the preferred embodiment of the present invention, by a process in which the tire is retreaded merely by the disposal about the worn surface of the tire of a preformed tire tread comprising a band of rubber or rubber-like material having a wire mesh embedded therein and extending circumferentially and continuously thereabout. More particularly, this band has treads preformed in its outer periphery and a flange projecting radially inwardly from each side of its inner periphery, and a continuous metal cord extends circumferentially within each flange and is secured to an adjacent side edge of the wire mesh.

Prior to disposal of the band about the worn tire surface, annular grooves are formed in such surface to closely receive the flanges. With the flanges so received, the cords extending thereabout will hold the band against lateral displacement from the worn surface of the tire, and the wire mesh will hold the lateral extent of the band against undue stretching and deformation, without being so inflexible as to injure the retreaded tire or interfere with its normal operation. Thus, the worn tire is retreaded without cooking, expensive equipment and the possibility of aggravated defects. Furthermore, there is no "downtime" other than that necessary to remove the tire from its rim, prepare the worn surface thereof, place the band about the prepared surface, and then remount the retreaded tire on the rim.

Still further, if the carcass of the retreaded tire should fail or be rendered useless prior to the preformed tread, the band may nevertheless be removed from such carcass for reuse on another one. The tire dealer or other party providing the retreading service need only stock a supply of the preformed retreads in addition to his ordinary stock and equipment, which generally includes buffers for preparing the worn surface of the tire, if desired, and conventional tools for grooving such surface.

In the drawings, wherein like reference characters are used throughout to designate like parts;

FIG. 1 is a cross-sectional view of an inflatable tire, including the outer portion as well as one inner edge thereof, and prior to substantial wear on the tread of the outer portion;

FIG. 2 is a cross-sectional view of the outer portion of the tire of FIG. 1, but after there has been substantial wear on the tread;

FIG. 3 is a view similar to FIG. 2, but wherein the worn surface of the tire has been prepared in accordance with the above-described process embodying this invention;

FIG. 4 is another cross-sectional view of the outer portion of the tire shown in FIG. 3, but during a subsequent step in the process in which the preformed band is being disposed about the prepared surface of the tire; and FIG. 5 is still another cross-sectional view of the outer portion of the tire, illustrating the final step in the process in which the flanges on the band have been fitted closely within the grooves of the prepared surface of the tire carcass.

With reference now to the details of the above-described drawings, the tire shown in FIG. 1 includes a carcass 10 made up of a number of plies separated by layers 11 of fabric reinforcement. As shown in the left-hand corner of FIG. 1, each side edge of the fabric layer is anchored to a metal cord 12 which extends circumferentially about each inner edge of the tire carcass. This, of course, not only retains the shape of the tire upon inflation, but also retains the carcass on the rim 13 of the wheel. The carcass is inflatable in a well known manner whether it be of the tubeless type, as illustrated, or the type in which an inner tube is disposed within the carcass.

As can be seen from FIG. 1, before becoming worn, the outer circumference of the carcass 10 has a tread 14 of any suitable design. More particularly, upon inflation of the carcass, the tread normally provides a crown intermediate shoulders 15 on the carcass along opposite sides of the tread. When this tread becomes worn, as shown in FIG. 2, the tire becomes too dangerous to be used without being retreaded. That is, at this stage of wear, the carcass is relatively thin along the center of its outer circumference, even though a fairly substantial portion of the shoulders 15 remains.

In the practice of this invention, and as shown in FIG. 3, grooves 16 are formed in the outer periphery of the tire carcass adjacent each side shoulder 15 thereof. In accordance with the preferred practice of the invention, the worn surface intermediate the grooves is buffed down to a level 17 beneath any remaining tread, but above the fabric layers 11 and the penetration of the grooves 16. As a result, an annular recess is formed about the prepared surface 17 of the carcass intermediate upstanding flanges 18 of the shoulders 15.

These grooves and buffed surface may be prepared either while the tire is on the rim or after it is removed therefrom. In any case, the prepared surface 17 is formed at least generally symmetrically of the tire. It is also preferred that the surface 17 be buffed to a predetermined depth relative to the inner circumference as well as the original outer circumference of the tire. In this manner, the preformed tread to be described will fit about the surface 17 as closely as possible.

The buffing of the worn surface of the tire carcass serves a number of purposes, whether or not to a measured depth. In the first place, it removes small rocks and other debris embedded in the worn surface, which might otherwise damage the preformed tread to be disposed about it or cause undesirable voids between the prepared carcass and preformed tread. Also, it provides a roughened surface 17 which reduces the possibility of slippage between the tread and carcass. Still further, the flanges 18 which result from the buffing are useful in preventing debris from access to the interface between the carcass and tread, as will be more apparent from the description to follow.

With the surface 17 and grooves 16 so prepared, the inner edges of the carcass are spread apart so as to reduce the effective outer diameter of the carcass, as indicated in FIG. 4. In this manner, the preformed tread 19 may be moved laterally over the surface 17 to approximately the position shown in FIG. 4. As will be described in connection with FIG. 5, the tread is then caused to be fitted about such surface upon release of the inner edges of the tire to permit it to return to its original shape.

As shown in FIGS. 4 and 5, the preformed tread 19 comprises a band 20 of rubber or rubber-like material, hereinafter referred to as "elastomeric" material, having a flange 21 projecting from each side of the inner periphery thereof. As previously described, a wire mesh 22 is embedded in the band 20 and extends circumferentially and continuously thereabout. A continuous metal cord 23 extends circumferentially within each flange 21 of the band and is secured in any suitable manner to an adjacent side edge of the wire mesh 22.

The band is of substantially the same width as the recess about buffed surface 17 so that with the preformed tread 19 disposed as shown in FIG. 4, the flanges 21 are disposed opposite each of the grooves 16. More particularly, the flanges 21 are of generally the same dimensions as the grooves. Thus, as mentioned above, when the inner edges of the carcass 10 are released so as to permit the effective outer diameter of the carcass to expand, grooves 16 will move radially outwardly to tightly receive the flanges 21. As shown in FIG. 5, and for a reason to be described hereinafter, when the flanges are so received, the cords 21 are also within the groove.

As also shown in FIG. 5, the inner circumference of the band is shaped to fit closely about the surface 17, and the outer circumference thereof has tread 24 formed on it. The band is of such thickness as to project upwardly a fairly substantial distance above each flange 18 of each shoulder 15 of the carcass 10. Thus, the wear on the retreaded tire is upon the material of the band 20.

The inner sides of the flanges 18 fit tightly against the outer opposite sides of the band 20. This in effect forms, a barrier against debris which might otherwise find its way into the grooves 16 about the flanges 18.

Since the continuous metal cords 21 are disposed within the grooves 16, as previously described, they will prevent the preformed tread 19 from being displaced laterally of the carcass 10. The wire mesh 22, on the other hand, reinforces the intermediate span of the band 20 against undue displacement and distortion during operation of the tire. That is, in effect it holds the band in its generally circular shape. For this purpose, the mesh is quite similar to that which is sometimes employed between the plies of tires in place of the more conventional fabric type reinforcement above described. Preferably, the mesh is formed of woven steel cables so as to provide more strength, and I contemplate that the cables of the mesh may be spaced approximately $3/32''$ apart and composed of several strands of wrapped wire about 0.006'' thick. Obviously, other wire meshes may be found suitable, and the foregoing example is merely for the purpose of illustration.

I further contemplate that, as above described, the tread 19 will be preformed into a band and thus may be kept in stock ready for immediate use. These bands may be formed of thin strips of the elastomeric material into which the wire mesh may be molded and on which the tread may be formed on a mass production basis.

The use of wire mesh will not only provide the required strength, but will also have several advantages over other reinforcing materials, such as sheet metal. For one thing, it has a desired amount of flexibility in addition to being strong enough to reinforce the band. Still further, it will permit the heat generated in the use of the tires at high speeds to be quickly dissipated. Also, even though rubber is not easily vulcanized to steel, the openings through the mesh permit it to be tightly gripped by the rubber of the band as it is molded therein.

In the event the tire carcass fails before the tread 19 is seriously worn, it may be removed therefrom by a reversal of the above-described procedure for use on another prepared carcass. Thus, as previously mentioned, the useful life of the preformed tread is not dependent on that of the carcass.

From the foregoing, it will be seen that this invention is one well adapted to attain all of the ends and objects hereinabove set forth, together with other advantages which are obvious and which are inherent to the method and article.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A method of retreading an inflatable tire, including the steps of forming annular grooves about the outer periphery of the worn tire carcass adjacent each side shoulder thereof, providing a preformed tread comprising a band of elastomeric material having treads formed in its outer periphery, a flange projecting radially inwardly from each side edge of its inner periphery, wire mesh embedded therein and extending circumferentially and continuously thereabout, and a continuous metal cord extending circumferentially within each flange and secured to an adjacent side of the wire mesh, and mounting the band about the outer periphery of the carcass with the flanges of said band fitted closely within the grooves.

2. A method of the character defined in claim 1, including the additional step of buffing the outer periphery of the worn tire carcass intermediate the grooves therein.

References Cited

UNITED STATES PATENTS

| | | | |
|---|---|---|---|
| 555,046 | 2/1896 | Kennedy | 152—188 |
| 1,599,114 | 9/1926 | Clement | 152—187 |
| 2,090,256 | 8/1937 | Heintz | 152—187 X |
| 3,024,828 | 3/1962 | Smith et al. | 152—361 X |

FOREIGN PATENTS 306,806  1930  Great Britain.

ARTHUR L. LA POINT, *Primary Examiner.*

C. HAEFELE, *Assistant Examiner.*